United States Patent [19]
Fukano et al.

[11] Patent Number: 5,771,918
[45] Date of Patent: Jun. 30, 1998

[54] DEVICE FOR CONNECTING OUTPUT PIPE TO VALVE

[75] Inventors: Yoshihiro Fukano; Yoshitada Doi, both of Ibaraki-ken, Japan

[73] Assignee: SMC Kabushiki Kaisha, Tokyo, Japan

[21] Appl. No.: 553,552

[22] PCT Filed: Apr. 18, 1994

[86] PCT No.: PCT/JP94/00639

§ 371 Date: Dec. 18, 1995

§ 102(e) Date: Dec. 18, 1995

[87] PCT Pub. No.: WO95/28590

PCT Pub. Date: Oct. 26, 1995

[51] Int. Cl.$^6$ .................................................. F16K 39/00
[52] U.S. Cl. ......................... 137/269; 137/271; 251/148; 251/367
[58] Field of Search .................................. 137/271, 269, 137/560; 251/367, 148

[56] References Cited

U.S. PATENT DOCUMENTS

| | | | |
|---|---|---|---|
| 3,215,158 | 11/1965 | Bass, Jr. et al. | 137/269 |
| 3,677,577 | 7/1972 | Krauer et al. | 137/269 |
| 3,698,432 | 10/1972 | Kutz | 137/271 |
| 4,140,144 | 2/1979 | Dowd et al. | 137/271 |
| 4,247,133 | 1/1981 | Möller | 137/271 |

*Primary Examiner*—A. Michael Chambers
*Attorney, Agent, or Firm*—Oblon, Spivak, McClelland, Maier & Neustadt, P.C.

[57] ABSTRACT

A valve body has second output ports defined in an upper surface thereof. To the second output ports there are selectively and detachably attached quick-connect-and-disconnect pipe couplings or a pipe adapter which provides communication between the second output ports and front output ports through output passages. When the quick-connect-and-disconnect pipe couplings are attached, output pipes can be connected to the valve body from its upper side through the quick-connect-and-disconnect pipe couplings. When the pipe adapter is attached, output pipes can be connected to the valve body from its front side through quick-connect-and-disconnect pipe couplings connected to the front output ports.

9 Claims, 4 Drawing Sheets

5,771,918

DEVICE FOR CONNECTING OUTPUT PIPE TO VALVE

BACKGROUND OF THE INVENTION

1. Field of the Invention

The present invention relates to a device for connecting an output pipe to a valve incorporated in a fluid pressure circuit or the like.

2. Discussion of the Background

Heretofore, there have been used valves for controlling the direction in or the rate at which a fluid under pressure flows, e.g. directional control valves, in fluid pressure circuits or the like. Such a directional control valve comprises a supply port, an output port, a discharge port, a valve body having a valve hole defined therein which communicates with these ports, and a valve member slidably disposed in the valve hole. When the valve member slides in the valve hole, the valve member connects the output port selectively to the supply port and the discharge port for connecting fluid passages to each other.

The output port of the directional control valve is open at an upper surface of the valve body, and a pipe joint is attached to the output port for connection to an output pipe such as a tube or the like. The output port is defined in the upper surface of the valve body for the layout of a communication passage between the outlet of the valve hole and the output port. Specifically, in view of the layout of the supply and discharge ports that are defined in a lower surface of the valve body, the output port is defined in the upper surface of the valve body to allow the communication passage between the outlet of the valve hole and the output port to be formed easily and inexpensively.

However, there are instances where the output pipe should preferably be connected to a front surface of the valve body depending on the location and attitude of the directional control valve and the manner in which the operator operates the directional control valve.

If the output port is defined in the front surface of the valve body to meet the above demand, however, the directional control valve suffers following disadvantages: First, it requires a considerable number of manufacturing steps and a high manufacturing cost to produce a communication passage between the output port in the front surface of the valve body and the outlet of the valve hole. Secondly, the user has to keep a plurality of types of valve bodies in stock in order to make available directional control valves of different structures, one having a valve body with an output port open at its upper surface and one having a valve body with an output port open at its front surface, with the result that a large expenditure of expenses will be required and the valve inventory control will be complicated. Thirdly, since the direction in which the output pipe is connected is limited to the upper surface of the valve body, if the environment in which the directional control valve is installed presents an obstacle near the upper surface of the valve body, then there will be difficulty in laying the output pipe.

SUMMARY OF THE INVENTION

The present invention has been made in order to solve the above problems. It is an object of the present invention to provide a valve output pipe connecting device which allows an output pipe to be connected to one valve body from its upper or front side, for thereby reducing a valve manufacturing cost, facilitating valve inventory control, lowering an expenditure of expenses, and permitting the output pipe to be laid simply without limitations posed on the direction in which it is connected.

With a valve output pipe connecting device according to the present invention, when a pipe joint is connected to a valve output port in an upper surface of a valve body, the pipe joint allows an output pipe to be connected to the valve body from its upper side.

When a pipe adapter is connected to the valve output port, a pipe joint connected to an adapter output port of the pipe adapter allows an output pipe to be connected to the valve body from its front side.

Therefore, selective connection of the pipe joint and the pipe adapter to the valve output port makes it possible to connect the output pipe to the same valve body from its upper side or front side.

DESCRIPTION OF THE PREFERRED EMBODIMENTS

The present invention will be described in detail with reference to the accompanying drawings.

FIGS. 1 through 5 show a preferred embodiment according to the present invention, which will be described with respect to directional control valves 10 as a specific example of valve. The directional control valves 10 can be installed through manifold bases 11 (see FIG. 5, described later on) or directly on a rail 12. The manifold bases 11 may comprise a plurality of respective separate blocks of substantially the same shape which are aligned with the respective directional control valves 10. The manifold bases 11 may be coupled to the respective directional control valves 10 are supported on the rail 12 which is elongate, thereby arranging the directional control valves 10 in an array. Alternatively, the directional control valves 10 may be mounted in an array on an elongate unitary manifold base 11.

Figure 2:
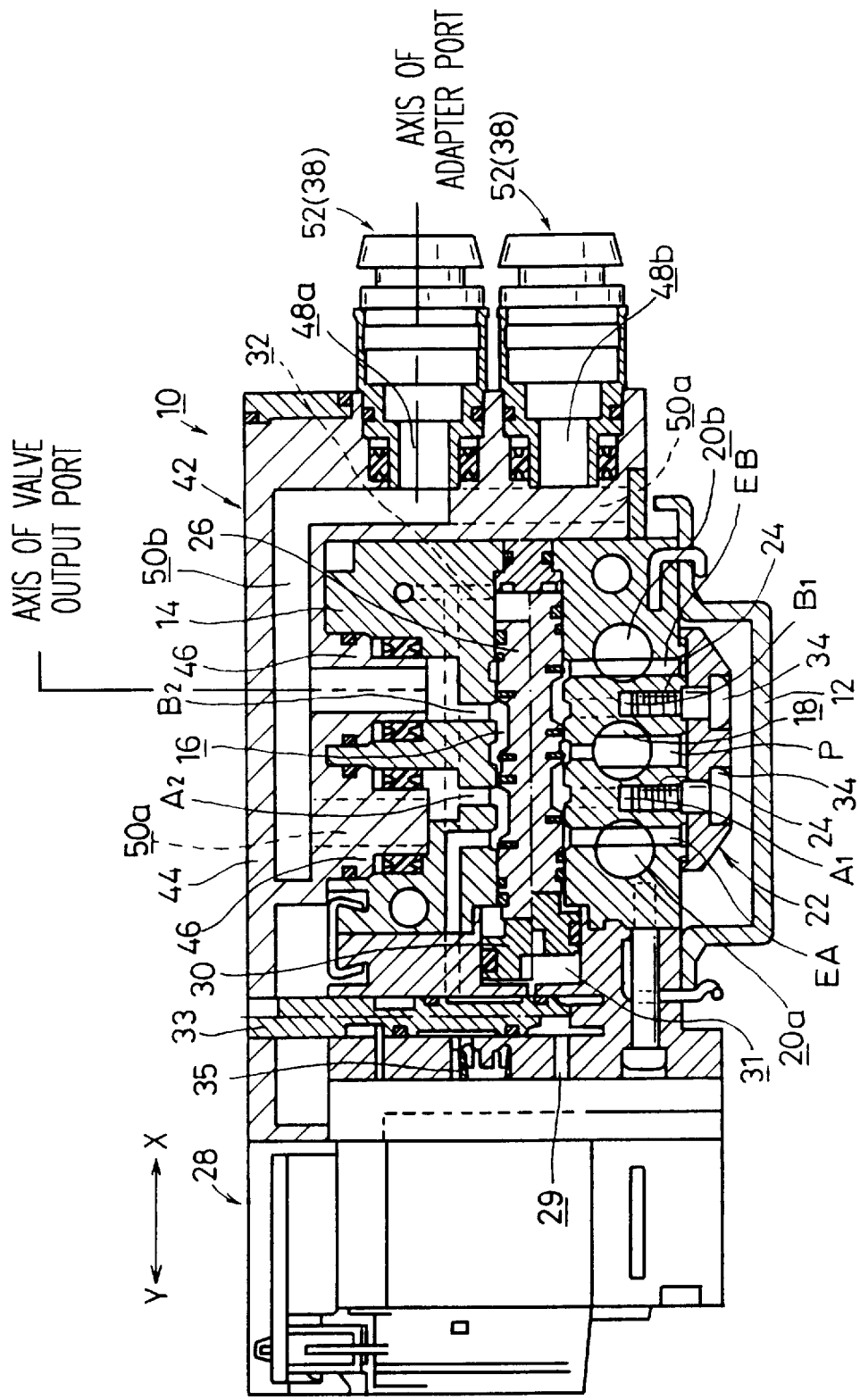
FIG. 2 is a longitudinal cross-sectional view of a pipe adapter and a directional control valve shown in FIG. 1.
Figure 3:
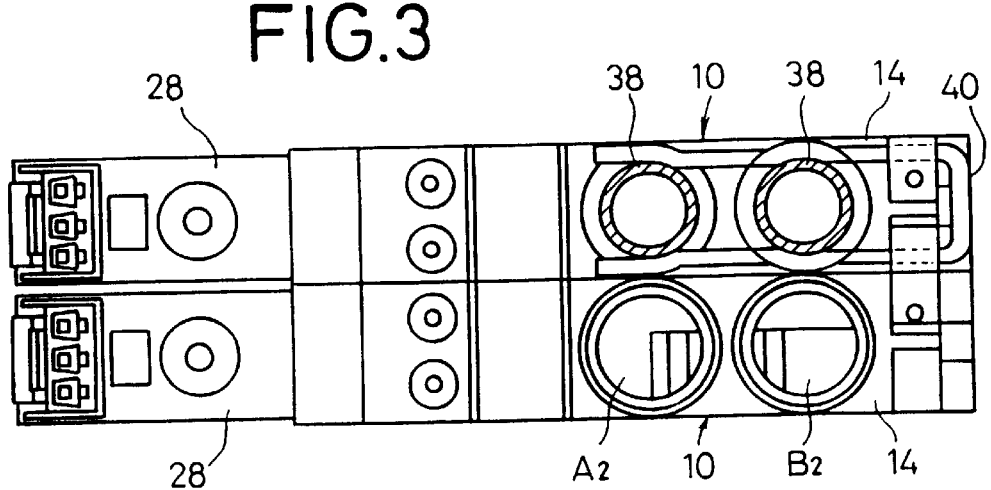
FIG. 3 is a plan view of directional control valves shown in FIG. 1 with pipe adapters removed.
Figure 4:
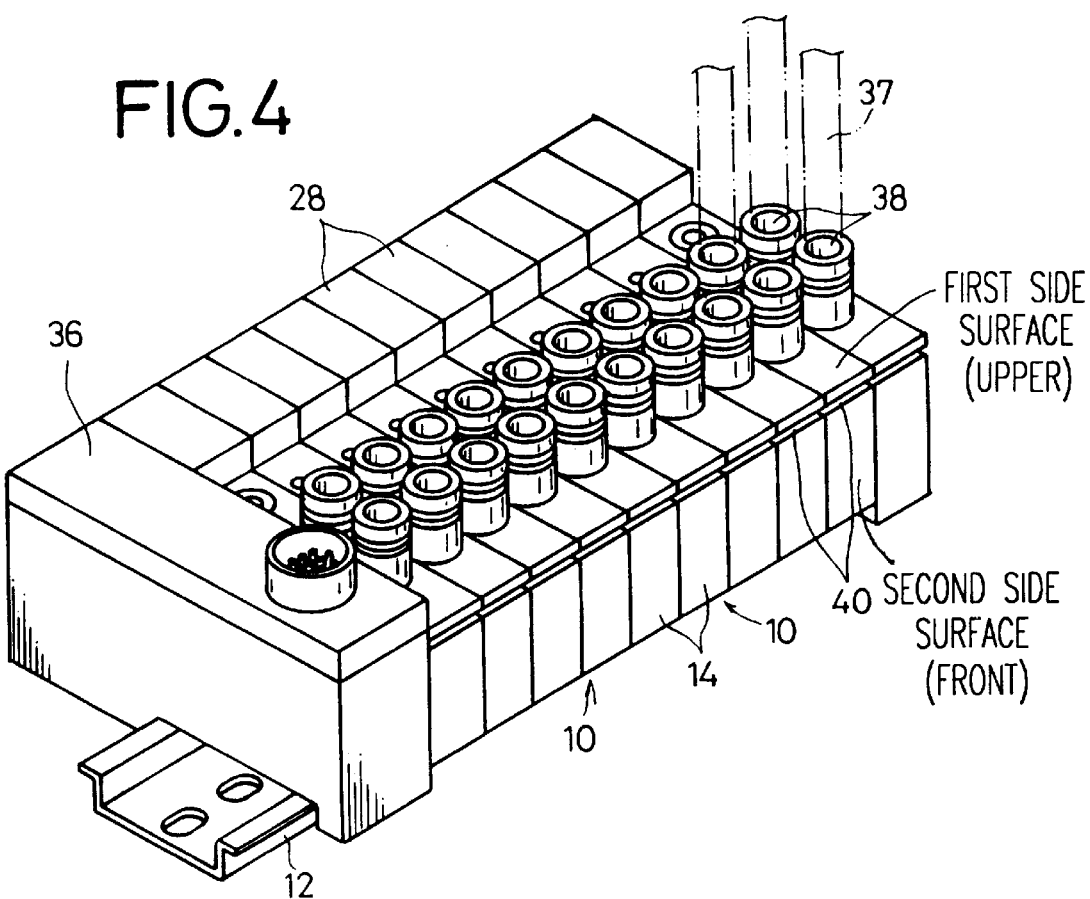
FIG. 4 is a perspective view showing pipe joints connected to directional control valves shown in FIG. 3.

As shown in FIG. 2, each of the directional control valves 10 comprises a valve body 14 having a supply port P, first output ports $A_1$, $B_1$ and second output ports $A_2$, $B_2$ (valve output ports) defined in the valve body 14 in confronting relation to each other, discharge ports EA, EB, a valve hole 16 communicating with the supply port P, the first output ports $A_1$, $B_1$, the second output ports $A_2$, $B_2$, and the discharge ports EA, EB, and extending axially in the valve body 14, and a supply passage 18 and discharge passages 20a, 20b which extend through the valve body 14 in the direction in which the directional control valves 10 are arrayed.

Figure 5:
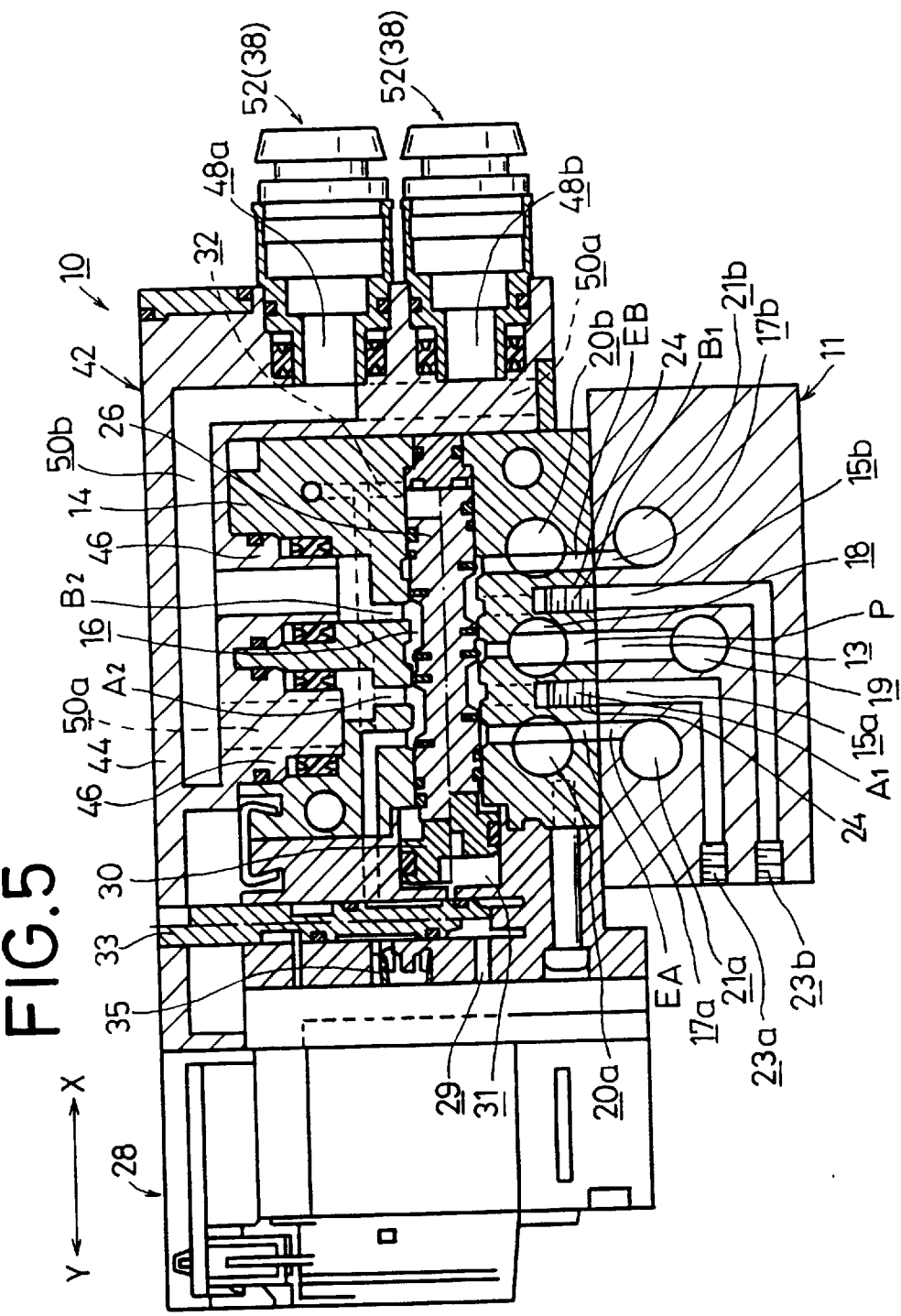
FIG. 5 is a longitudinal cross-sectional view of a directional control valve shown in FIG. 1 with a manifold base coupled thereto.

The supply port P, the first output ports $A_1$, $B_1$, and the discharge ports EA, EB are open at a lower surface of the valve body 14 in respective positions for communication with a supply opening 13, output openings 15a, 15b, and discharge openings 17a, 17b in the manifold base 11 (see FIG. 5). The second output ports $A_2$, $B_2$ are open at an upper surface (first side surface) of the valve body 14. The supply passage 18 communicates with the supply port P, and the discharge passages 20a, 20b communicate respectively with the discharge ports EA, EB. The first output ports $A_1$, $B_1$ have respective openings that are internally threaded for use as attachments 24 for a blanking plate 22 (described later on).

The supply opening 13 and discharge openings 17a, 17b, which are open at an upper surface of the manifold base 11, communicate respectively with a supply flow passage 19 and discharge flow passages 21a, 21b which extend through the manifold base 11 in the direction in which the manifold bases 11 are arrayed. The output openings 15a, 15b communicate respectively with output ports 23a, 23b that are open at a front surface of the manifold base 11 (see FIG. 5).

Figure 1:
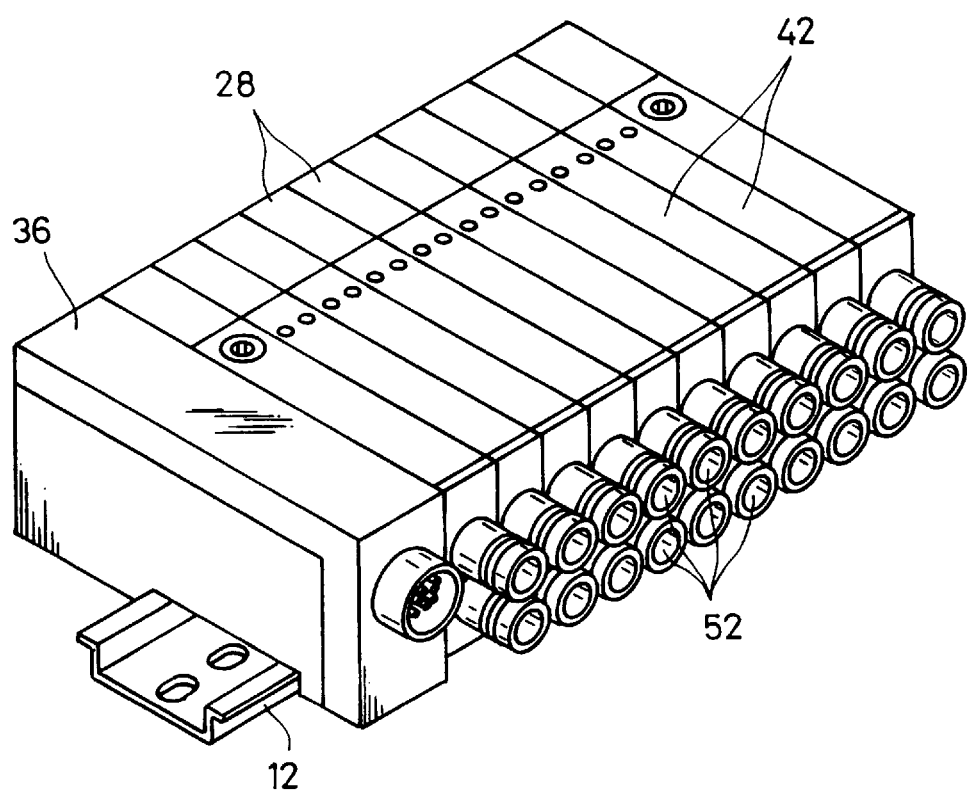
FIG. 1 is a perspective view of an embodiment of the present invention, showing pipe adapters mounted on directional control valves and arrayed on a rail.

A spool valve 26 is disposed in the valve hole 16 for sliding movement in the direction indicated by the arrow X or Y. The spool valve 26 is selectively movable under a pilot fluid pressure produced by a solenoid-operated pilot valve 28 into a first switching position in which the supply port P and the output ports $A_1$, $A_2$ communicate with each other and the output ports $B_1$, $B_2$ and the discharge port EB communicate with each other, and a second switching position in which the supply port P and the output ports $B_1$, $B_2$ communicate with each other and the output ports $A_1$, $A_2$ and the discharge port EA communicate with each other. In FIG. 1, the portion of the spool valve 26 below its axis is shown as being displaced in the direction indicated by the arrow X into the first switching position, and the portion of the spool valve 26 above its axis is shown as being displaced in the direction indicated by the arrow Y into the second switching position.

Specifically, when the solenoid-operated pilot valve 28 is actuated to supply the pilot fluid pressure through a passage 29 into the valve hole 16 from an end thereof, a pilot valve 30 is displaced in the direction indicated by the arrow X, pushing the spool valve 26 in the direction indicated by the arrow X into the first switching position. The other end of the valve hole 16 is always supplied with the fluid under pressure through a passage 32 which communicates with the supply passage 18. When the solenoid-operated pilot valve 28 is deactivated, the spool valve 26 is pushed in the direction indicated by the arrow Y under the pressure of the fluid supplied to the other end of the valve hole 16, and the fluid under pressure which remains in a pilot chamber 31 is discharged from the discharge port EA through a passage (not shown). As a result, the spool valve 26 is displaced in the direction indicated by the arrow Y into the second switching position. The directional control valve 10 may comprise a three-port valve or a four-port valve, and the spool valve 26 may be operated under forces other than the pilot fluid pressure. The area of the pilot valve 30 on which the fluid under pressure acts, i.e., the pressure-bearing area of the pilot valve 30, is selected to be greater than the pressure-bearing area of the spool valve 26. Therefore, the force with which the pilot valve 30 is pushed under the pilot fluid pressure is greater than the pushing force that is generated by the fluid under pressure which is supplied to the other end of the valve hole 16.

In an end of the directional control valve 10, there is disposed a manual switching member 33 which can manually be lowered to shift the pilot valve 30 in the event of a failure of the solenoid-operated pilot valve 28 for some reason. A check valve 35 for blocking a reverse flow of the fluid under pressure to prevent the pilot valve 30 from operating erroneously is disposed closely to the manual switching member 33.

The blanking plate 22 has a size that can be mounted between an upper surface of the rail 12 and a lower surface of the valve body 14. When the blanking plate 22 is fastened to the attachments 24 in the lower surface of the valve body 14 by attachment screws 34, the blanking plate 22 closes all the supply port P, the first output ports $A_1$, $B_1$, and the discharge ports EA, EB. With the blanking plate 22 thus attached, the fluid under pressure is introduced into the supply passage 18 which extends through the valve body 14 in the direction in which the directional control valves 10 are arrayed, and the fluid under pressure which is introduced into the supply passage 18 is discharged from the discharge passages 20a, 20b through a communication passage (not shown) that is defined in an end block 36 (see FIGS. 1 and 4) coupled to an end of the array of directional control valves 10.

Therefore, the valve body 14 can be joined to the rail 12 either through the manifold base 11 or directly with the blanking plate 22 attached to the lower surface of the valve body 14.

In the second output ports $A_2$, $B_2$, there are mounted quick-connect-and-disconnect pipe couplings 38 that can be engaged by output pipes 37 (see FIG. 4), which may be in the form of tubes, and allow the output pipes 37 to be removed when release bushings are pressed. The quick-connect-and-disconnect pipe couplings 38 are detachably mounted by substantially U-shaped clips 40 inserted from the front side of the valve body 14.

Instead of the quick-connect-and-disconnect pipe couplings 38 mounted in the second output ports $A_2$, $B_2$, pipe adapters 42 may be attached to the second output ports $A_2$, $B_2$. As shown in FIG. 2, each of the pipe adapters 42 is disposed in substantially covering relation to the upper and front surfaces of the valve body 14. The pipe adapter 42 comprises an adapter body 44 having a substantially L-shaped longitudinal cross section, two inserts 46 hermetically inserted in the respective second output ports $A_2$, $B_2$, front output ports 48a, 48b (adapter output ports) defined in a position corresponding to the front surface (second side surface) of the directional control valve 10, and output passages 50a, 50b communicating between the second output ports $A_2$, $B_2$ of the directional control valve 10 and the front output ports 48a, 48b. Other quick-connect-and-disconnect pipe couplings 52, which are substantially identical to the quick-connect-and-disconnect pipe couplings 38 mounted in the second output ports $A_2$, $B_2$, may be mounted in the respective front output ports 48a, 48b. Alternatively, the quick-connect-and-disconnect pipe couplings 38 directly mounted in the second output ports $A_2$, $B_2$ may be detached and inserted into the pipe adapter 42.

In this embodiment, the plural directional control valves 10 and the plural pipe adapters 42 are arrayed along the rail 12. Since he plural directional control valves 10 and the plural pipe adapters 42 are substantially identical in structure, they will not be described in detail.

Operation and advantages of the directional control valve 10 according to the embodiment of the present invention, which is basically constructed as described above, will be described below.

First, an application in which the pipe adapter 42 is not used, but the output pipes 37 are connected to the second output ports $A_2$, $B_2$ defined in the upper surface of the valve body 14 will be described below.

The quick-connect-and-disconnect pipe couplings 38 are mounted in the second output ports $A_2$, $B_2$, and the output pipes 37 are connected through the quick-connect-and-disconnect pipe couplings 38 to the directional control valve 10 from above the valve body 14. A plurality of directional control valves 10 to each of which the quick-connect-and-disconnect pipe couplings 38 are attached are arrayed longitudinally along the rail 12 (see FIG. 4). As described above, the quick-connect-and-disconnect pipe couplings 38 can easily be attached to and detached from the valve body 14 by the clips 40.

Next, another application in which the operator connects the output pipes 37 to the valve body 14 from its front side depending on the location and attitude of the directional control valve 10 will be described below.

The second output ports $A_2$, $B_2$ of the valve body 14 and the inserts 46 of the pipe adapter 42 are aligned with each other, and the pipe adapter 42 is attached to the directional control valve 10 such that the inserts 46 are inserted respectively into the second output ports $A_2$, $B_2$. Prior to the attachment of the pipe adapter 42, the quick-connect-and-disconnect pipe couplings 38 have been removed from the second output ports $A_2$, $B_2$. As shown in FIG. 2, the upper and front surfaces of the valve adapter 14 are held in contact with inner wall surfaces of the pipe adapter 42. Then, the quick-connect-and-disconnect pipe couplings 52 (38) are mounted in the respective output ports 48a, 48b of the pipe adapter 42. Thereafter, the output pipes 37 are connected respectively to the quick-connect-and-disconnect pipe couplings 52 (38) that are disposed in a position corresponding to the front surface of the valve body 14.

Therefore, the quick-connect-and-disconnect pipe couplings 38 or the pipe adapter 42 which is selectively connected by the operator to the second output ports $A_2$, $B_2$ defined in the upper surface of the valve body 14, allows the output pipes 37 to be connected to the same valve body 14 from the upper or front side thereof.

As described above, when the quick-connect-and-disconnect pipe couplings 38 or the pipe adapter 42 is selectively connected by the operator to the second output ports $A_2$, $B_2$, the output pipes 37 can be connected to the same valve body 14 from the upper or front side thereof depending on the location and attitude of the directional control valve 10. Consequently, the manufacturing cost is reduced and the inventory control is facilitated at the manufacturer, and an expenditure of expenses is reduced and the output pipes 37 can be laid simply at the user.

The valve output pipe connecting device according to the present invention can widely be used in a fluid pressure circuit, or a machine, a component, an apparatus or the like which utilizes a fluid pressure.

We claim:

1. A device for connecting an output pipe to a valve, said device comprising:

a supply port;

an output port;

a discharge port;

a valve body having a valve hole defined therein, said hole communicating with the supply, output, and discharge ports, said valve body further comprising a valve output port;

a valve member disposed in said valve body and displaceable inside the valve body;

a pipe adapter selectively and detachably attached to the valve output port defined in a first side surface of the valve body, an axis of said valve output port extending in a first direction, said pipe adapter having respective surfaces of abutting against said first side surface and another second side surface of said valve body;

wherein said pipe adapter comprises an adapter output port, an axis of said adapter output port extending in a second direction substantially perpendicular to said first direction, for attachment of a pipe joint for connection to an output pipe, and an output passage defined in said pipe adapter for communication between said valve output port and said adapter output port.

2. A device according to claim 1, wherein said valve comprises a directional control valve.

3. A device according to claim 2, wherein a plurality of directional control valves are arrayed on a rail either through manifold bases or directly.

4. A device according to claim 3, wherein said plurality of directional control valves are arrayed on said rail directly, further comprising a blanking plate mounted on a lower surface of said valve body.

5. A device according to claim 4, wherein said lower surface of the valve body has an internally threaded opening for attachment of said blanking plate.

6. A device according to claim 2, wherein said valve output port and said adapter output port having the same configuration, such that when said pipe adapter is detached from said valve body, the pipe joint may be directly attached to the valve output port of said valve body.

7. A device according to claim 2, wherein said first side surface comprises an upper surface of the valve body, and said second side surface comprises a front surface of the valve body.

8. A device according to claim 1, wherein said valve output port and said adapter output port having the same configuration, such that one said pipe adapter is detached from said valve body, the pipe joint may be directly attached to the valve output port of said valve body.

9. A device according to claim 1, wherein said first side surface comprises an upper surface of the valve body, and said second side surface comprises a front surface of the valve body.

* * * * *